(12) United States Patent
Beers et al.

(10) Patent No.: US 8,994,261 B2
(45) Date of Patent: *Mar. 31, 2015

(54) ENHANCED COLOR CONTRAST LIGHT SOURCE

(75) Inventors: William W. Beers, Chesterland, OH (US); Laszlo Balazs, Godollo (HU); Istvan Bakk, Torokbalint (HU)

(73) Assignee: General Electric Company, Schenectady, NY (US)

( * ) Notice: Subject to any disclaimer, the term of this patent is extended or adjusted under 35 U.S.C. 154(b) by 1145 days.

This patent is subject to a terminal disclaimer.

(21) Appl. No.: 12/246,110

(22) Filed: Oct. 6, 2008

(65) Prior Publication Data

US 2009/0102391 A1  Apr. 23, 2009

Related U.S. Application Data

(63) Continuation-in-part of application No. 11/873,463, filed on Oct. 17, 2007, now Pat. No. 8,278,814.

(51) Int. Cl.
| | |
|---|---|
| *H01J 61/067* | (2006.01) |
| *H01J 61/42* | (2006.01) |
| *C09K 11/77* | (2006.01) |
| *H05B 41/282* | (2006.01) |

(Continued)

(52) U.S. Cl.
CPC ........ *H05B 41/2822* (2013.01); *C09K 11/7792* (2013.01); *C09K 11/7776* (2013.01); *C09K 11/778* (2013.01); *C09K 11/7777* (2013.01); *C09K 11/7734* (2013.01); *C09K 11/595* (2013.01); *H01J 61/44* (2013.01); *C09K 11/665* (2013.01); *C09K 11/7774* (2013.01); *C09K 11/71* (2013.01); *H01J 61/35* (2013.01)

USPC .......................................... 313/486; 313/487

(58) Field of Classification Search
USPC .................................................. 313/486–487
See application file for complete search history.

(56) References Cited

U.S. PATENT DOCUMENTS

| | | |
|---|---|---|
| 4,847,533 A | 7/1989 | Hoffman |
| 5,602,444 A | 2/1997 | Jansma |

(Continued)

FOREIGN PATENT DOCUMENTS

| | | |
|---|---|---|
| CA | 2560656 A1 | 10/2005 |
| CN | 1165933 A | 11/1997 |

(Continued)

OTHER PUBLICATIONS

W. Davis, Y. Ohino: "Toward an improved color rendering metric" SPIE, PO Box 10 Bellingham WA 98227-0010 USA, vol. 5941, No. 59411, 2005, pp. 1-8, XP040209336.

(Continued)

*Primary Examiner* — Karabi Guharay
(74) *Attorney, Agent, or Firm* — GE Global Patent Operation; Peter T. DiMauro

(57) ABSTRACT

A lamp having improved color quality scale is provided. The lamp has a light-transmissive envelope and a phosphor layer comprising a first phosphor and a second phosphor wherein the first phosphor has an emission band with a maximum between 590 nm and 670 nm and the second phosphor has an emission band with a maximum between 520 nm and 570 nm. The light generated by the phosphor layer, when the lamp is energized, has delta chroma values for fifteen color samples of the color quality scale within select parameters. The delta chroma values are measured in the CIE LAB color space.

29 Claims, 6 Drawing Sheets

(51) Int. Cl.
*C09K 11/59* (2006.01)
*H01J 61/44* (2006.01)
*C09K 11/66* (2006.01)
*C09K 11/71* (2006.01)
*H01J 61/35* (2006.01)

(56) References Cited

U.S. PATENT DOCUMENTS

| | | |
|---|---|---|
| 5,770,917 A | 6/1998 | Yano et al. |
| 5,961,208 A | 10/1999 | Karpen |
| 6,222,312 B1 | 4/2001 | Ghosh et al. |
| 6,867,536 B2 | 3/2005 | Srivastava et al. |
| 6,992,432 B1 | 1/2006 | Jansma |
| 7,391,148 B1 | 6/2008 | Setlur et al. |
| 7,550,910 B2 | 6/2009 | Jansma |
| 7,670,507 B2 | 3/2010 | Konrad et al. |
| 7,744,243 B2 | 6/2010 | Van De Ven et al. |
| 2003/0102817 A1 | 6/2003 | Yoo |
| 2004/0075395 A1 | 4/2004 | Antoniadis |
| 2004/0130256 A1 | 7/2004 | Juestel et al. |
| 2005/0179358 A1* | 8/2005 | Soules et al. ............ 313/487 |
| 2005/0258733 A1* | 11/2005 | Igarashi et al. ......... 313/487 |
| 2006/0022582 A1 | 2/2006 | Radkov |
| 2006/0071589 A1 | 4/2006 | Radkov |
| 2006/0261723 A1 | 11/2006 | Terada |
| 2007/0223219 A1 | 9/2007 | Medendorp, Jr. et al. |
| 2009/0102348 A1 | 4/2009 | Beers et al. |
| 2009/0102391 A1 | 4/2009 | Beers et al. |
| 2009/0122530 A1 | 5/2009 | Beers et al. |
| 2009/0134769 A1 | 5/2009 | Cavallaro et al. |
| 2009/0309482 A1 | 12/2009 | Srivastava et al. |
| 2010/0096988 A1 | 4/2010 | Kitabayashi et al. |

FOREIGN PATENT DOCUMENTS

| | | | |
|---|---|---|---|
| CN | 1507004 A | | 6/2004 |
| EP | 0945894 A1 | | 9/1999 |
| JP | 2001185082 A | | 7/2001 |
| JP | 2005075867 A | | 3/2005 |
| JP | 2005116419 A | | 4/2005 |
| JP | 2006227188 A | | 8/2006 |
| JP | 2007141737 A | | 6/2007 |
| WO | 2008006205 A | | 1/2008 |
| WO | 2008013780 A2 | | 1/2008 |
| WO | 2008150392 A1 | | 12/2008 |
| WO | PCT/US2008/079034 | | 3/2009 |

OTHER PUBLICATIONS

Y. Ohno: Measurement of LEDS and Solid State Lighting [Online] Oct. 18, 2007, pp. 1-49, XP002569094. Available from internet url: http://cie-cnc.ca/en/Ohno%20CNC-USNC%202007.pdf; pp. 45-46.

W. Davis: "Measuring color quality of light sources", SPIE, PO Box 10 Bellingham WA 98227-0010 USA, vol. 6337, No. 63370, 2006, pp. 1-10, XP040229620.

International Search Report issued in connection with corresponding PCT Application No. PCT/US2009/065615 on Jan. 28, 2010.

JP Office Action dated Feb. 26, 2013 from corresponding JP Application No. 2010-530027.

OHNO, "Spectral Design Considerations for White LED Color Rendering", Optical Engineering, vol. No. 44, Issue No. 11, pp. 9, Nov. 2005.

Davis et al., "Color Quality Scale", Optical Engineering, vol. No. 49, Issue No. 3, pp. 16, Mar. 2010.

Zukauskas et al., "Colour-Rendition Properties of Solid-State Lamps", Journal of Physics D Applied Physics, vol. No. 43, Issue No. 35, pp. 11, Aug. 19, 2010.

"Phosphor Mixture for Colour-Variable Fluorescent Lamp", IP.COM Journal, IP.COM Inc., Oct. 3, 2006.

PCT Search Report issued in connection with corresponding Application No. PCT/US2009/055806 on Apr. 27, 2010.

Unofficial English Translation of Japanese Office Action issued in connection with corresponding JP Application No. 2011543527 on Jul. 09, 2013.

Unofficial English Translation of Taiwan Office Action issued in connection with corresponding TW Application No. 098142924 on Apr. 07, 2014.

Unofficial English Translation of Japanese Office Action issued in connection with corresponding JP Application No. 2011543527 on Apr. 30, 2014.

* cited by examiner (Estimated Emission Spectrum)

(Estimated Emission Spectrum)

(Estimated Emission Spectrum)

(Estimated Emission Spectrum)

ENHANCED COLOR CONTRAST LIGHT SOURCE

CROSS REFERENCE TO RELATED APPLICATIONS

This application is a continuation-in-part utility application claiming priority under 35 U.S.C. 120 of prior-filed copending application Ser. No. 11/873,463, filed 17 Oct. 2007, entitled "ENHANCED COLOR CONTRAST LIGHT SOURCE", which is hereby incorporated by reference in its entirety.

FIELD OF THE INVENTION

The present invention relates to a lamp, and in some embodiments, to a fluorescent lamp having enhanced color contrast.

BACKGROUND

Fluorescent lighting provides an energy-efficient alternative to common incandescent lighting. However, the adoption of fluorescent lighting has been hindered in certain applications such as illuminating items in a retail setting. The quality of object color under fluorescent lighting is an important aspect of the value of the light source. Fluorescent lighting can produce visible light having muted light in the red region of the spectrum and an overemphasized amount of light in the yellow region. This lighting has been observed to produce cold or sterile light and light that generally washes out colors of the items being illuminated.

Incandescent lamps are known to generate significant light in the yellow region of the visible spectrum such as that produced by fluorescent lamps. One solution has been to filter out a portion of the yellow light with a glass envelope containing the rare earth element neodymium. An incandescent light bulb using neodymium doped glass is the REVEAL® bulb produced by GE. These bulbs depress light in the yellow region and thus have a greater red-green color contrast when compared with regular incandescent bulbs. As a result, consumers have found the enhanced color contrast light produced by the incandescent REVEAL® bulbs to be appealing. Thus, it would be desirable to develop light sources with enhanced color contrast similar to those achievable by neodymium glass-filtered incandescent sources. This has not heretofore been achievable for non-incandescent lamps.

Filtration with neodymium glass also tends to reduce the quantity of light produced by incandescent lamps. This disadvantage is acceptable due to the sufficient brightness of incandescent lamps. However, reduced lumen output in other lighting sources such as fluorescent lighting is less acceptable. There is a need for light sources other than incandescent lamps that generate enhanced color contrast without suffering from losing light output through filtering methods such as using neodymium glass.

BRIEF SUMMARY OF THE INVENTION

In one aspect of embodiments of the invention, is provided a lamp having an improved color quality scale comprising a phosphor layer having a phosphor composition comprising at least a first phosphor and a second phosphor. The first phosphor can be selected from Yttrium Oxide:Eu ($Y_2O_3$:Eu) (YEO); $3.5MgO*0.5MgF_2*GeO_2$:$Mn^{4+}$ (MfG); Gadolinium Zinc Magnesium Pentaborate: Ce, Mn ($Gd(Zn,Mg)B_5O_{10}$:Ce,Mn) (CBM); Strontium red $(Sr, Mg)_3(PO_4)_2$:Sn and yttrium vanadate ($Y(V,P)O_4$:Eu) or combinations thereof The second phosphor can be selected from (Ba,Sr,Ca)$MgAl_{10}O_{17}$:$Eu^{2+}$,$Mn^{2+}$ (BAMn); Cerium Lanthanum Phosphate ($LaPO_4$:Ce,Tb) (LAP); $ZnSiO_4$:Mn; (Ce,Tb)$MgAl_{11}O_{19}$ (CAT) and (Ce,Tb)(Mg,Mn)$Al_{11}O_{19}$; or combinations thereof.

In another aspect of embodiments of the invention, is provided a lamp having an improved color quality scale, the lamp comprising a phosphor layer comprising a phosphor composition. The composition comprises at least a first phosphor and a second phosphor, with the first phosphor having an emission band with a maximum between about 590 nm and about 670 nm, wherein the first phosphor is present in an amount of about 10 to about 90 weight percent. The second phosphor has an emission band with a maximum between about 500 nm and about 570 nm, wherein the second phosphor is present in an amount of about 5 to about 50 weight percent. The lamp has a $Q_a$ value greater than about 60 and a correlated color temperature between about 2000 and about 3500 Kelvin.

In yet another aspect of embodiments of the invention, is provided a lamp which when energized exhibits a correlated color temperature of between about 2000 Kelvin to about 3500 Kelvin and having an improved color quality scale. The lamp comprises at least one light-emitting element having a light emission when energized, with the proviso that the lamp does not comprise an incandescent light-emitting element. When the lamp is energized it generates light with a total light emission having delta chroma values as follows: at least two color samples of the CQS are within the parameters −2 to 7 for VS1, −3 to 7 for VS2, and −7 to 7 for VS3; at least one color sample of the CQS is within the parameters −2 to 8 for VS4 and −2 to 14 for VS5; at least two color samples of the CQS are within the parameters 1 to 25 for VS6, 4 to 25 for VS7, and −1 to 15 for VS8; at least two color samples of the CQS are within the parameters −2 to 7 for VS9, −4 to 6 for VS10, and −2 to 8 for VS11; at least one color the CQS is within the parameters −1 to 8 for VS12 and −1 to 13 for VS13; and at least one color sample of the CQS is within the parameters −7 to 13 for VS14 and −9 to 12 for VS15. The delta chroma values are measured in the CIE LAB space.

Other features and advantages of this invention will be better appreciated from the following detailed description.

DETAILED DESCRIPTION

Figure 1:
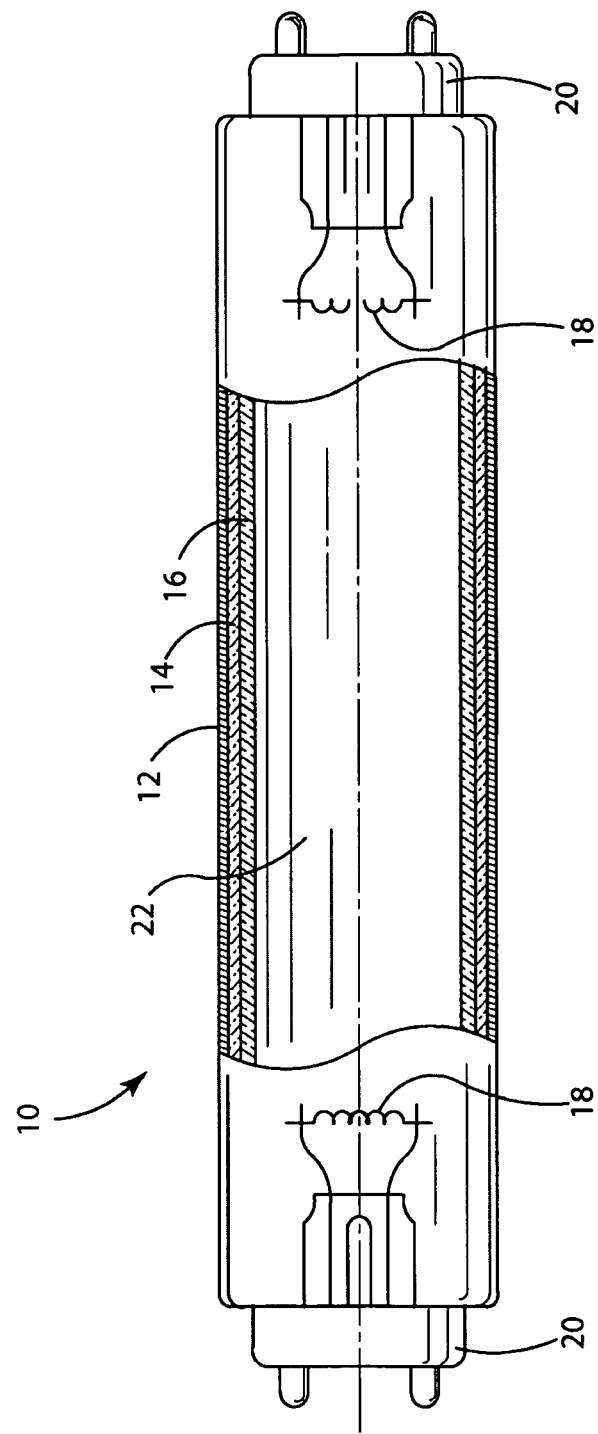
FIG. 1 shows diagrammatically, and partially in section, a lamp according to embodiments of the present invention.

As used herein, the term "lamp" and "light source" will be utilized substantially interchangeably, to refer to any source of visible and/or ultraviolet light which can be generated by at least one light-emitting element having a light emission when energized and selected from the group consisting of phosphor, vapor discharge, high intensity discharge, and combinations thereof. The term "total light emission" refers to the combined light emitted from a lamp having one or more light-emitting elements, as defined above. If the lamp (for example) contains only one light emitting element (e.g., a white-light emitting element), such light emission is included in the definition of the term total light emission. If a lamp contains more than one light emitting element, the combination of the light from all the elements will also be an example of what may constitute a total light emission. Total light emission may also refer to the combined light emitted from a lamp having one or more light-emitting elements as defined above, and further including light from other types of elements (e.g., LED and/or OLED). It is a preferred embodiment of the invention that the lamp does not comprise an incandescent light-emitting element. The term "incandescent light-emitting element" is generally understood by persons skilled in the field to mean those elements which emit light and/or thermal radiation due to heating. These include those well known light-emitting elements having a filament which glows upon heating induced by an electric current passing through the filament. According to embodiments of the present invention, the term "lamp" includes, but is not limited to, fluorescent lamps, discharge lamps, and combinations thereof; or the like.

In one aspect of embodiments of the invention, is provided a lamp having an improved color quality scale comprising a phosphor layer having a phosphor composition comprising a first phosphor and a second phosphor. The first phosphor can be selected from Yttrium Oxide:Eu ($Y_2O_3$:Eu) (YEO); $3.5MgO*0.5MgF_2*GeO_2$:$Mn^{4+}$ (MfG); Gadolinium Zinc Magnesium Pentaborate: Ce, Mn (Gd(Zn,Mg)$B_5O_{10}$:Ce,Mn) (CBM); Strontium red (Sr, Mg)$_3$(PO$_4$)$_2$:Sn and yttrium vanadate (Y(V,P)O$_4$:Eu), or combinations thereof, or the like. The second phosphor can be selected from (Ba,Sr,Ca)MgAl$_{10}$O$_{17}$:$Eu^{2+}$,$Mn^{2+}$ (BAMn); Cerium Lanthanum Phosphate (LaPO$_4$:Ce,Tb) (LAP); ZnSiO$_4$:Mn; (Ce,Tb)MgAl$_{11}$O$_{19}$ (CAT) and (Ce,Tb)(Mg,Mn)Al$_{11}$O$_{19}$, or combinations thereof; or the like. According to this embodiment, the light emitting element is a phosphor.

Note that in the above phosphors, the element(s) following the colon represents activator(s). The various phosphors of any color described herein can have different elements enclosed in parentheses and separated by commas, such as in (Ba,Sr,Ca)MgAl$_{11}$O$_{17}$:$Eu^{2+}$,$Mn^{2+}$ phosphor. As would be understood by anyone skilled in the art, the notation (A,B,C) signifies ($A_xB_yC_z$) where $0 \le x \le 1$ and $0 \le y \le 1$ and $0 \le z \le 1$ and $x+y+z=1$. For example, (Sr,Ca,Ba) signifies ($Sr_xCa_yBa_z$) where $0 \le x \le 1$ and $0 \le y \le 1$ and $0 \le z \le 1$ and $x+y+z=1$. Typically, but not always, x, y, and z are all nonzero. The notation (A,B) signifies ($A_xB_y$) where $0 \le x \le 1$ and $0 \le y \le 1$ and $x+y=1$. Typically, but not always, x and y are both nonzero.

Generally, such first phosphor can have an emission band with a maximum between about 590 to about 670 nm, and such second phosphor can have an emission band with a maximum between about 500 to about 570 nm. There may also be utilized a further phosphor having an emission band with a maximum between about 430 and about 490 nm.

According to certain embodiments, one may employ a third phosphor selected from the group consisting of (Ba,Sr,Ca)MgAl$_{10}$O$_{17}$:$Eu^{2+}$; (Sr,Ba,Ca)$_5$(PO$_4$)$_3$Cl:Eu; Sr$_4$Al$_{14}$O$_{25}$:Eu; Y$_3$Al$_5$O$_{12}$:Ce; Ca$_{10}$(PO$_4$)$_6$FCl:Sb,Mn; and combinations thereof, or the like. In many cases, a lamp according to embodiments has a first phosphor comprising $Y_2O_3$:Eu, and a second phosphor comprising (Ba,Sr,Ca)MgAl$_{10}$O$_{17}$:$Eu^{2+}$, $Mn^{2+}$. Such a lamp may exhibit a correlated color temperature of between about 2000 to about 3500 Kelvin and a color quality scale $Q_a$ value (to be fully described below) of about 60 or above.

Certain lamps described herein may be constructed of a light-transmissive glass envelope having an inner surface carrying the phosphor layer, and a discharge-sustaining fill gas sealed inside the envelope. A barrier layer may be positioned between the envelope and the phosphor layer; such barrier layer typically comprises alumina particles. In many cases, the discharge-sustaining fill gas contains mercury or the like.

One manner of construction of the present lamp can be described with reference to FIG. 1, which shows a low pressure mercury vapor discharge lamp 10, many types of which is generally well known in the art. The lamp 10 has a light-transmissive, possibly linear and cylindrical, glass tube or envelope 12 that may have a circular cross section. The inner surface of the envelope 12 is may be provided with a reflective barrier coating or layer 14 for improved light softness and brightness maintenance with age. The inner surface of the barrier layer 14 may be provided with a phosphor layer 16. Typically, such a barrier layer 14 is between the envelope 12 and the phosphor layer 16. According to embodiments of the invention, lamp 10 can be a fluorescent lamp, such as a T12, T10 or T8 lamp, which is generally known in the art, nominally 48 inches or 4 feet in length, a cylindrical tube, and having a nominal outer diameter of at least 1 inch or an outer diameter of 1 inch or about 1 inch. The lamp 10 can also be nominally 1.5, 2, 3, 5, 6 or 8 feet long. Alternatively, the lamp 10 can be nonlinear, for example circular or otherwise curvilinear in shape, or have a nominal outer diameter less than one inch such as a T5, T4 or T3 lamp having nominal outer diameters of about 0.625 (⅝) inch, 0.5 (½) inch and 0.375 (⅜) inch, respectively. In this alternative case, the lamp 10 can also be nominally 1.5, 2, 3, 4, 5, 6 or 8 feet long, or it may be a compact fluorescent lamp (CFL) (as shown in FIG. 2) having a folded or wrapped topology so that the overall length of the lamp is much shorter than the unfolded length of the glass tube.

In another embodiment, the lamp can be a fluorescent or CFL lamp in combination with an LED (not specifically depicted in a figure). For instance, a combination of LED-generated light and phosphor-generated light may be used to produce visible light having enhanced color contrast. In this instance, an LED can be mounted in the base of a fluorescent or CFL lamp to add to or supplement light in select wavelength regions of the visible spectrum, such as a portion of the red region, to the light being generated by the phosphor composition coated on the glass envelope of a lamp. For example, an LED mounted in the base of a fluorescent or CFL lamp can generate light in the red region and thus a phosphor composition can be selected that excludes or minimizes the use of red phosphors. Such a lamp might include, for instance, a blend of phosphors, such as YEO, LAP, BAM, and BAMn, and an LED that generates visible light having a peak emission in the range of 615 to 645 nm, typically 625 to 635 nm, or about 625 nm, 630 nm or 635 nm. The weight percent of each phosphor in the blend can be generally about 64 wt % YEO, 14 wt % LAP, 1 wt % BAM and 21 wt % BAMn. It is to be understood that the respective weight percents of the phosphors of the phosphor blend can vary depending on the selected manufacturer or supplier and the specific lot used. For example, the above phosphor weight percents can vary about ±5 wt %. The LED preferably emits in the red region of the visible spectrum. For example, a Golden Dragon® Thin-film/ThinGaN® LED (type LR W5SM) supplied by OSRAM Opto Semiconductors, which has an emission at about 625 nm, can be used as an LED in the base of a CFL lamp.

Figure 3:
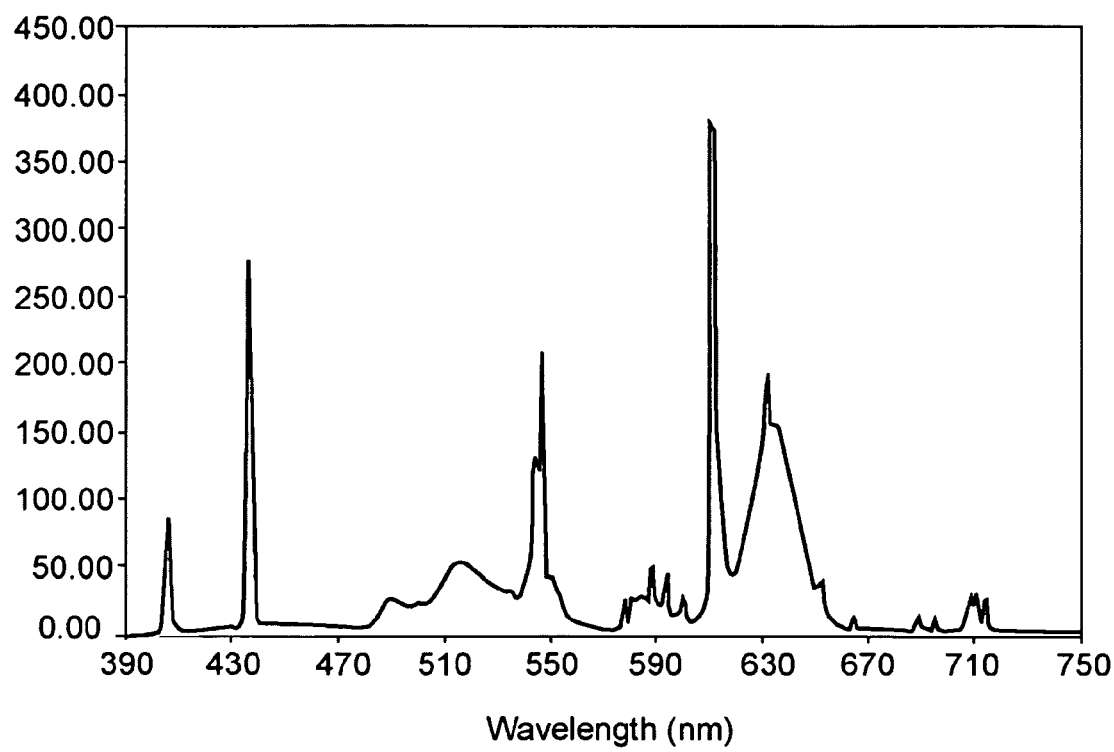
FIG. 3 is a theoretical estimated emission spectrum for a compact fluorescent lamp having a LED device providing a portion of the visible spectrum.

Although a lamp containing the above-noted blend of phosphors and an LED was not constructed, the emission spectrum of such a lamp was calculated and estimated in order to evaluate its improved color contrast. FIG. 3 shows a calculated emission spectrum for a 9-watt compact fluorescent lamp having a phosphor blend of approximately 64 wt % YEO, 14 wt % LAP, 1 wt % BAM and 21 wt % BAMn and one OSRAM Golden Dragon® LED, type LR W5SM, having an emission peak at about 635 nm.

In yet another embodiment of the present disclosure, the lamp can be a vapor discharge or a high-intensity discharge (HID) lamp. Such HID lamp may include, for example, mercury vapor, metal halide, low-pressure sodium or high-pressure sodium lamps. HID lamps produce light by generating an electric arc across two electrodes that are generally located inside a tube, such as a fused quartz or fused alumina tube. The tube is filled with gas and metals, as generally known in the art. The metals generate light when the lamp is activated.

In a further embodiment of the present disclosure, the lamp can be a vapor discharge or HID lamp, but further supplemented with light from one or more LED and/or an OLED (organic electroluminescent device) within the lamp.

Figure 2:
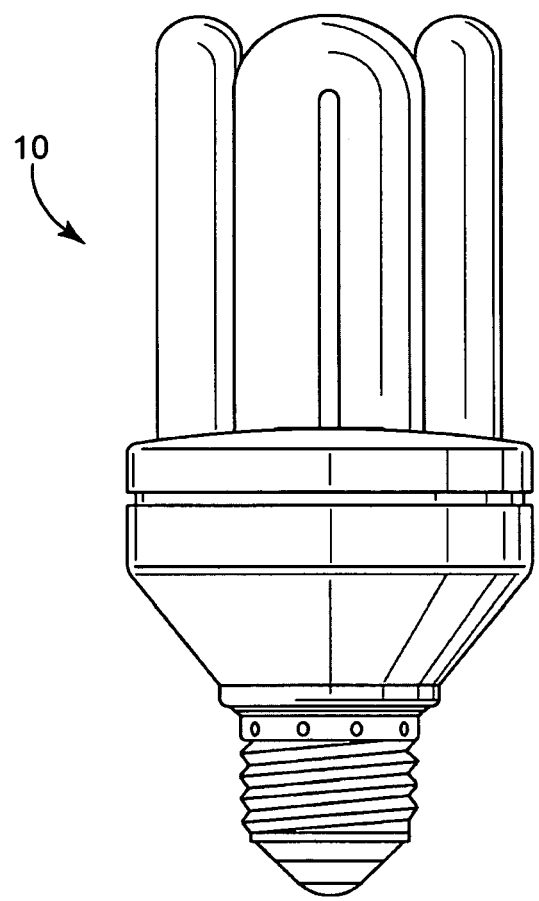
FIG. 2 shows a compact fluorescent lamp according to embodiments of the present invention.

According the aspects of the present disclosure, a fluorescent lamp 10 may typically be constructed as in FIG. 1. The lamp 10 is hermetically sealed by bases 20 attached at both ends, and electrodes or electrode structures 18 (to provide an arc discharge) are respectively mounted on the bases 20. A discharge-sustaining fill 22 is provided inside the sealed glass envelope, the fill comprising or being an inert gas or inert gas mixture at a low pressure, typically (although not always) in combination with a small quantity of mercury, in a low-vapor-pressure manner of lamp operation.

The inert gas in the fill comprises at least one rare gas such as, but not limited to, argon, krypton, xenon and neon or combinations thereof. The total pressure of the fill 22 (including mercury vapor and inert gas) may range from 0.4 to 4 torr (more narrowly 1-3, even more narrowly 1.6-2.8 torr) at the conventional fill temperature as known in the art, for example 25° C.

The general coating structure is typically as taught in U.S. Pat. No. 5,602,444. This coating structure is known in the art. As disclosed in the '444 patent, the barrier layer 14 comprises a blend of gamma- and alpha-alumina particles that are preferably 5-80 or 10-65 or 20-40 weight percent gamma alumina and 20-95 or 35-90 or 60-80 weight percent alpha alumina. The phosphor layer 16 is coated on the inner surface of the barrier layer 14 and preferably has a coating weight of 1-5 or 2-4 mg/cm$^2$ or other conventional coating weight.

The phosphor layer 16 may typically comprise a phosphor composition having a mixture of at least two phosphors. Phosphor blends comprising other numbers of phosphors such as blends with three or more phosphors, may be used in the phosphor layer 16.

As already noted above, another aspect of embodiments of the invention provides a lamp having an improved color quality scale, the lamp comprising a phosphor layer comprising a phosphor composition. The composition comprises at least a first phosphor and a second phosphor, with the first phosphor having an emission band with a maximum between about 590 nm and about 670 nm, wherein the first phosphor is present in an amount of about 10 to about 90 weight percent. The second phosphor has an emission band with a maximum between about 500 nm and about 570 nm, wherein the second phosphor is present in an amount of about 5 to about 50 weight percent. The lamp has a $Q_a$ value greater than about 60 and a correlated color temperature between about 2000 and about 3500 Kelvin.

In this embodiment, the first and second may be chosen from the same list of first and second phosphors previously set forth above. Likewise, a third phosphor, if present, may be chosen from the same list of third phosphors previously set forth above. It may be advantageous to have the first phosphor be $Y_2O_3$:Eu and the second phosphor be (Ba,Sr,Ca)$MgAl_{11}O_{17}$:$Eu^{2+}$,$Mn^{2+}$. In certain cases, this lamp may also comprise a phosphor having an emission band with a maximum between about 430 and about 490 nm. Finally, this lamp may be constructed according to any of the phosphor-containing lamps described above.

As already noted above, yet another broad aspect of embodiments of the invention provides a lamp which when energized exhibits a correlated color temperature of between about 2000 Kelvin to about 3500 Kelvin and having an improved color quality scale. The lamp comprises at least one light-emitting element having a light emission when energized, with the proviso that the lamp does not comprise an incandescent light-emitting element. When the lamp is energized it generates light with a total light emission having delta chroma values as follows: at least two color samples of the CQS are within the parameters −2 to 7 for VS1, −3 to 7 for VS2, and −7 to 7 for VS3; at least one color sample of the CQS is within the parameters −2 to 8 for VS4 and −2 to 14 for VS5; at least two color samples of the CQS are within the parameters 1 to 25 for VS6, 4 to 25 for VS7, and −1 to 15 for VS8; at least two color samples of the CQS are within the parameters −2 to 7 for VS9, −4 to 6 for VS10, and −2 to 8 for VS11; at least sample of the CQS is within the parameters −1 to 8 for VS12 and −1 to 13 for VS13; and at least one color sample of the CQS is within the parameters −7 to 13 for VS14 and −9 to 12 for VS15. The delta chroma values are measured in the CIE LAB space.

Creating light having the VS values noted above may reproduce desirable spectra characteristics of a REVEAL® light bulb, yet without the need for filtration or decreased lumen output associated with filtration methods. Light from a lamp as above often has a depressed yellow region and an enhanced red-green color contrast that is useful in illuminating objects such that the objects appear appealing to consumers.

By way of explanation, the color appearance of a lamp, per se (as opposed to objects illuminated by such lamp) is described by its chromaticity coordinates or color coordinates, which (as would be understood by those skilled in the art) can be calculated from its spectral power distribution according to standard methods. This is specified according to CIE, *Method of measuring and specifying color rendering properties of light sources* (2nd ed.), Publ. CIE No. 13.2 (TC-3, 2), Bureau Central de la CIE, Paris, 1974. (CIE is the International Commission on Illumination, or, Commission Internationale d'Eclairage). The CIE standard chromaticity diagram is a two-dimensional graph having x and y coordinates. This standard diagram includes the color points of black body radiators at various temperatures. The locus of black body chromaticities on the x,y-diagram is known as the Planckian locus. Any emitting source represented by a point on this locus may be specified by a color temperature, with units of Kelvin. A point near but not on this Planckian locus can be characterized by a correlated color temperature (CCT), because lines can be drawn from such points to intersect the Planckian locus at this color temperature such that all points look to the average human eye as having nearly the same color. Therefore, in sum, lamps can be characterized, at least in part, in terms of color coordinates and CCT.

In embodiments of the disclosure, any of the types of lamps previously described above will exhibit enhanced or improved color contrast, provided that they are configured to be in accordance with the delta chroma values of the present invention. The blend of light-emitting elements in the lamp provides light that is useful in illuminating objects such that the objects appear appealing. Lamps according the embodiments of the present disclosure may include one light emitting element, or may include a blend of light-emitting elements, and in either case generate light having an enhanced color contrast.

In particular, the color contrast of the light is characterized such that it has delta chroma (Δ-chroma) values, as described below, falling within certain parameters for each of the color samples utilized in the Color Quality Scale (CQS), a scale which will be also be further described hereinunder. As the term is used herein, "chroma" values are measured in the CIE LAB space. The chroma values can be calculated by conventional techniques, for example, in the CIE LAB color space. For example, the CIE 1976 a,b chroma value is calculated as $C^*_{ab}=[(a^*)^2+(b^*)^2]^{1/2}$, as would be well known to those skilled in the art, and as may be found in standard handbooks in the field such as Illuminating Engineering Society of North America Lighting Handbook (ISBN-10: 0-87995-150-8).

The CQS, as developed by the National Institute of Standards and Technology (NIST), uses fifteen Munsell color samples to evaluate aspects of the color of objects illuminated by a light source, such as that similarly done by the better-known Color Rendering Index (CRI). Now, the older CRI system utilizes fourteen standard color samples (denoted $R_1$-$R_{14}$, or $R_i$ in general) to evaluate the color rendering. Typically, when a color rendering score according to the CRI is reported, it is a "general color rendering index" (termed Ra), which is the average of the $R_i$ values for only the first eight samples, all of which are at low to medium chromatic saturation. The CRI system of measuring object color, however, suffers from disadvantages; for example, the red region of the color space is non-uniform and the eight color samples used to calculate the Ra are not highly saturated. Color rendering of saturated colors can be very poor even when the Ra value is high. In other words, one may optimize the spectrum of a lamp according to a very high value of Ra, and yet the actual color rendering is much poorer; because the eight color samples are simply averaged to obtain a Ra value, a lamp can score high even though it renders one or two colors very poorly. This problem arises because too few samples of high chromatic saturation are used to calculate Ra.

CQS overcomes these disadvantages of the CRI system and is therefore used according to embodiments of this disclosure, as the system to evaluate the aspects of object color. The CQS system uses an overall $Q_a$ value that incorporates the color appearance of a total of fifteen color samples, of which all have relatively high chromatic saturation and are substantially evenly distributed in the color space. The $Q_a$ value generally corresponds to the average of the individual CQS values for each of the fifteen color samples. Calculation of the $Q_a$ value is more fully described in W. Davis and Y. Ohno, "Toward an improved color rendering metric," Proc. SPIE Fifth International Conference on Solid State Lighting, 5941, 2005, the entire contents of which are hereby incorporated by reference.

As set by NIST, the CQS utilizes a standard set of fifteen saturated Munsell color samples (sometimes referred to as color "chips") having the hue value and chroma shown in Table 1.

TABLE 1

| VS of the CQS | Hue value | Chroma |
|---|---|---|
| VS1 | 7.5 P 4 | 10 |
| VS2 | 10 PB 4 | 10 |
| VS3 | 5 PB 4 | 12 |
| VS4 | 7.5 B 5 | 10 |
| VS5 | 10 BG 6 | 8 |
| VS6 | 2.5 BG 6 | 10 |
| VS7 | 2.5 G 6 | 12 |
| VS8 | 7.5 GY 7 | 10 |
| VS9 | 2.5 GY 8 | 10 |
| VS10 | 5 Y 8.5 | 12 |
| VS11 | 10 YR 7 | 12 |
| VS12 | 5 YR 7 | 12 |
| VS13 | 10 R 6 | 12 |
| VS14 | 5 R 4 | 14 |
| VS15 | 7.5 RP 4 | 12 |

These values (hue value/chroma) respectively correspond to the fifteen Munsell color samples of the CQS, which are labeled as VS1 through VS15 inclusive (i.e. VS1-VS15). In other words, VS1 corresponds to the first standard Munsell color sample, VS2 corresponds to the second Munsell color sample, and so on. The hue labels have the following descriptions: "P" is purple, "PB" is purple-blue, "B" is blue, "BG" is blue-green, "G" is green, "GY" is green-yellow, "Y" is yellow, "YR" is yellow-red, "R" is red and "RP" is red-purple.

The CQS is typically used in the following manner. A lamp (or other light source) generates light having chroma values for each color chip, at a given correlated color temperature (CCT) and at a given color point (or chromaticity coordinates) for the light. These chroma values are then compared with a reference set of chroma values for each color chip generated using a reference source. That reference source is Planckian blackbody radiation having both the same color temperature, and the same color point (chromaticity coordinates) as the light source under study. The delta chroma (Δ-chroma) value for each color chip under illumination by the lamp or light source under study, is the arithmetic difference between the chroma value of lamp or light source, and the reference source chroma value.

According to embodiments, there are desirable delta chroma (Δ-chroma) values for the light emitted by the lamps of the present invention. The delta chroma values are useful for identifying color perceptions and evaluating the enhanced color contrast of the lamp or light sources described herein. The delta chroma values can be used to select, make, and/or evaluate a lamp according to embodiments of the present disclosure.

In broader embodiments of the disclosure, any of the previously described lamps may be configured to exhibit desirable delta chroma values as shown in Table 2, at a CCT of from about 2000 K to about 3500 K. Note that other possible values for CCT include a range of from about 2000 K to about 3000 (or 3250K), and possibly from about 2500 to about 3000K.

TABLE 2

| Broader Delta Chroma Values |  |
|---|---|
| Choose at least two of the following three: | |
| VS1 | −2 to 7 |
| VS2 | −3 to 7 |
| VS3 | −7 to 7 |

TABLE 2-continued

Broader Delta Chroma Values

Choose at least one of the following two:

| | |
|---|---|
| VS4 | −2 to 8 |
| VS5 | −2 to 14 |

Choose at least two of the following three:

| | |
|---|---|
| VS6 | 1 to 25 |
| VS7 | 4 to 25 |
| VS8 | −1 to 15 |

Choose at least two of the following three:

| | |
|---|---|
| VS9 | −2 to 7 |
| VS10 | −4 to 6 |
| VS11 | −2 to 8 |

Choose at least one of the following two:

| | |
|---|---|
| VS12 | −1 to 8 |
| VS13 | −1 to 13 |

Choose at least one of the following two:

| | |
|---|---|
| VS14 | −7 to 13 |
| VS15 | −9 to 12 |

In more narrow embodiments of the disclosure, any of the above lamps may be configured to exhibit desirable delta chroma values as shown in Table 3, at a CCT of from about 2000 K to about 3500 K.

TABLE 3

Narrower Delta Chroma Values

Choose at least two of the following three:

| | |
|---|---|
| VS1 | 0 to 6 |
| VS2 | −1 to 6 |
| VS3 | −5 to 5 |

Choose at least one of the following two:

| | |
|---|---|
| VS4 | 0 to 5 |
| VS5 | 0 to 10 |

Choose at least two of the following three:

| | |
|---|---|
| VS6 | 3 to 20 |
| VS7 | 6 to 20 |
| VS8 | 2 to 10 |

Choose at least two of the following three:

| | |
|---|---|
| VS9 | 0 to 5 |
| VS10 | 0 to 5 |
| VS11 | 0 to 5 |

Choose at least one of the following two:

| | |
|---|---|
| VS12 | 0 to 6 |
| VS13 | 0 to 10 |

Choose at least one of the following two:

| | |
|---|---|
| VS14 | −6 to 10 |
| VS15 | −8 to 10 |

For embodiments exhibiting the VS values above, the lamp may include light emitting elements such as phosphors or a blend of two or more phosphors, present in a phosphor layer. In such cases where two or more phosphors are employed, the first and second may be chosen from the same list of first and second phosphors previously set forth above. Such first phosphor may have an emission band with a maximum between about 590 nm and about 670 nm (e.g., from 600 to 630 nm, or from 605 to 620 nm), and such said second phosphor may have an emission band with a maximum between about 500 nm and about 570 nm (e.g., from 520 to 560 nm, or from 535 to 555 nm).

Likewise, a third phosphor, if present, may be chosen from the same list of third phosphors previously set forth above. It may be advantageous to have the first phosphor be $Y_2O_3$:Eu and the second phosphor be $(Ba,Sr,Ca)MgAl_{10}O_{17}$:$Eu^{2+}$, $Mn^{2+}$. In certain cases, this lamp may also comprise a phosphor having an emission band with a maximum between about 430 and about 490 nm. Finally, this lamp may be constructed according to any of the phosphor-containing lamps described above.

Figure 4:
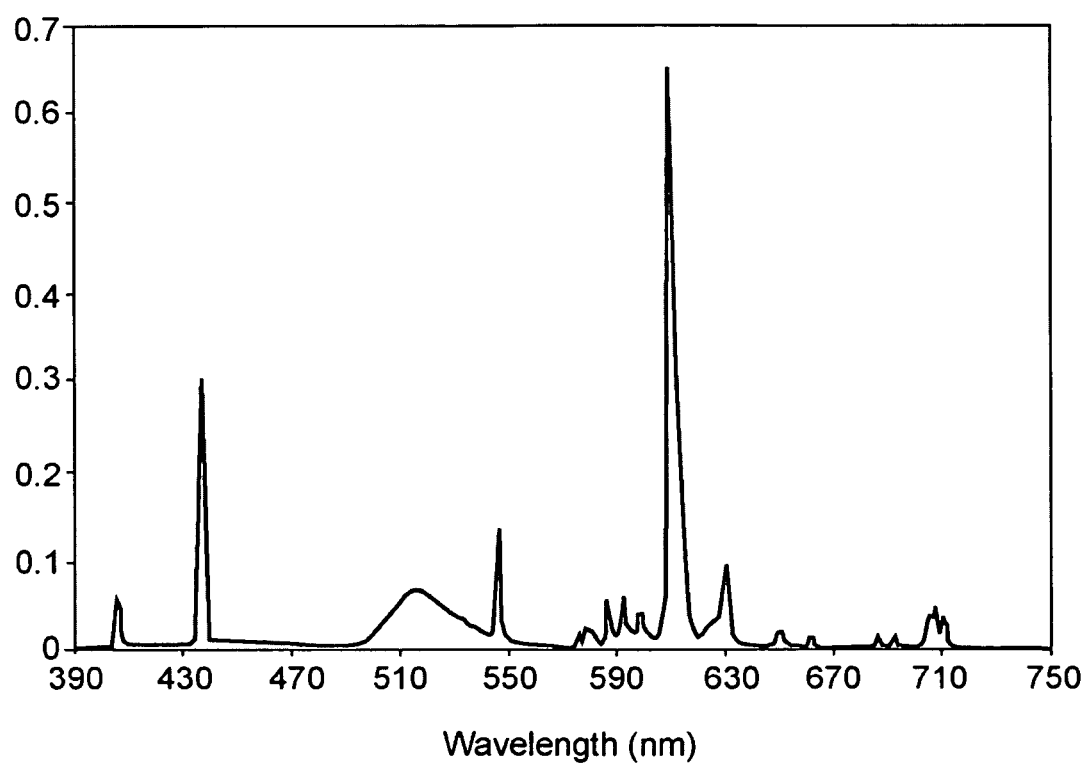
FIG. 4 is an emission spectrum for the multi-phosphor lamp of Example 1 having a CCT of about 2750K.
Figure 5:
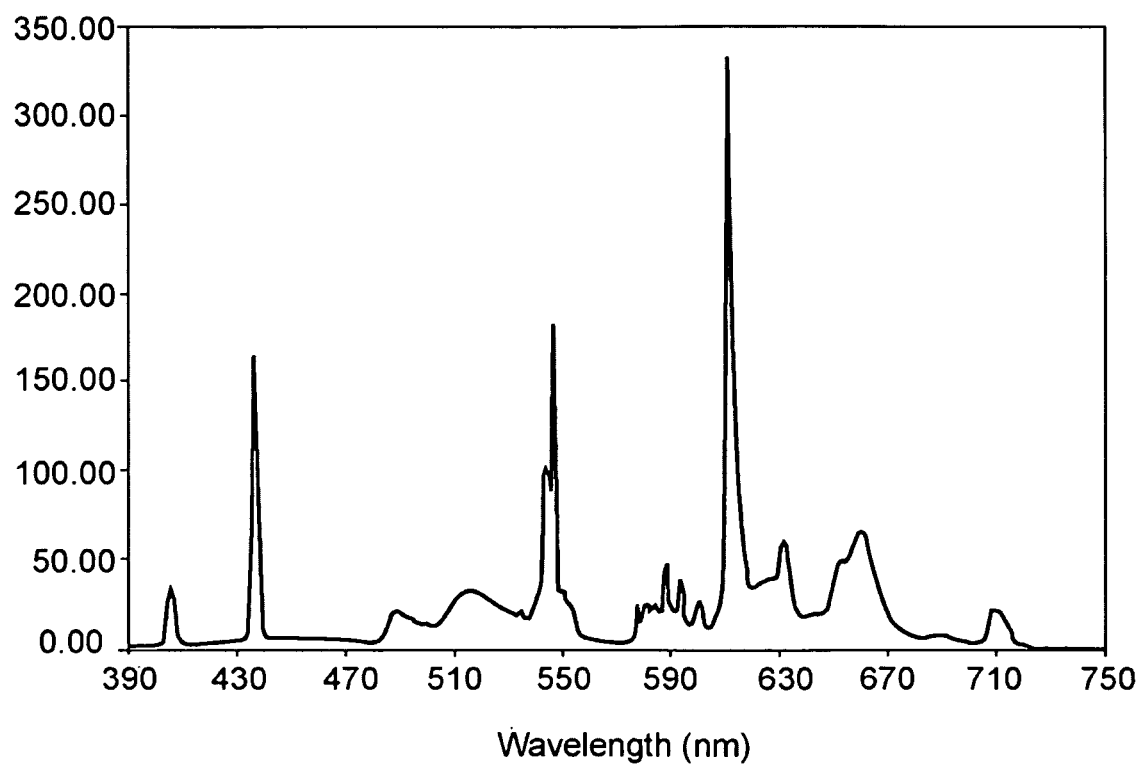
FIG. 5 is an emission spectrum for the multi-phosphor lamp of Example 2 having a CCT of about 2750K.
Figure 6:
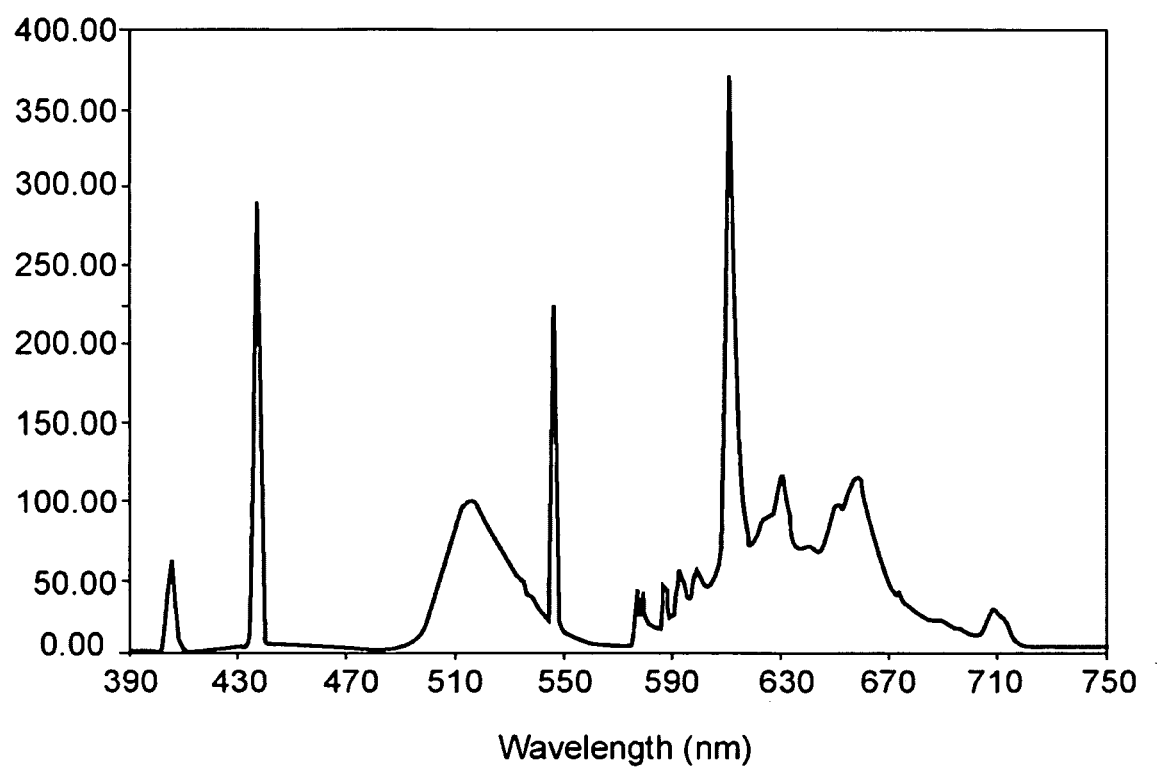
FIG. 6 is an emission spectrum for the multi-phosphor lamp of Example 5 having a CCT of about 2750K.

Preferably, the first phosphor has a weight percentage of about 10 to about 90 wt %, preferably 20 to 80 wt % and preferably 25 to 75 wt %. Preferably, the second phosphor has a weight percentage of about 5 to about 50 wt %, preferably 10 to 40 wt % and preferably 15 to 30 wt %. Weight percentages as used herein are based on total weight of the phosphor composition. It is understood the phosphor blend converts radiation at a specified wavelength, for example radiation with a peak from about 250 to 500 nm as emitted by a UV source, into visible light of a different wavelength. Exemplary emission spectra for lamps 10 of the present invention are shown in FIGS. 4, 5 and 6.

Individual phosphor material amounts used in the phosphor composition of the phosphor layer will vary depending upon the desired color spectra and/or color temperature. The relative amount of a phosphor material can be described by its spectral weight. That is, the spectral weight is the amount each phosphor material supplies to the overall emission spectra. It is to be understood that one of ordinary skill in the art would appreciate that other phosphor compounds having similar emission spectra may be used in the phosphor compositions described herein. The weight percent of each phosphor composing the phosphor layer 16 may vary depending on the characteristics of the desired light output.

In order to promote a further understanding of the invention, the following examples are provided. These examples are shown by way of illustration and not limitation.

Example 1

A T8 fluorescent lamp was constructed in accordance with otherwise conventional procedures, but with a phosphor layer comprising Yttrium Oxide:Eu ($Y_2O_3$:Eu) (YEO); $(Ba,Sr,Ca)MgAl_{10}O_{17}$:$Eu^2$ (BAM) and $(Ba,Sr,Ca)MgAl_{10}O_{17}$:$Eu^{2+}$, $Mn^{2+}$ (BAMn). The weight percents (based on total weight of the phosphors) of the phosphors were 74.6 wt %, 0.9 wt % and 24.5 wt %, respectively. The lamp comprised a barrier layer between the glass envelope and the phosphor layer. FIG. 4 shows the emission spectrum for the lamp of this Example.

When energized, the lamp generated light having delta chroma values for each of the fifteen color samples of the CQS system as follows (delta chroma value/CQS color sample): −1.1/VS 1; 3.7/VS 2; −4.5/VS 3; 4.2/VS 4; 10.6/VS 5; 18.6/VS 6; 22/VS 7; 7.6/VS 8; −1/VS 9; 2.5/VS 10; 1.4/VS 11; 4.7/VS 12; 8.1/VS 13; −2.2/VS 14 and −5.6/VS 15. The lamp produced chromaticity coordinates (x,y) of 0.446 and 0.391, an operating lumens per watt (L/w) value of about 76 and a $Q_a$ value of 66 at a CCT of about 2750.

The chroma values for the light generated as measured in the CIE LAB space for each of the fifteen color samples were as follows 32.38/VS 1; 39.27/VS 2; 44.68/VS 3; 54.76/VS 4; 55.17/VS 5; 62.88/VS 6; 68.89/VS 7; 54.18/VS 8; 59.96/VS 9; 79.03/VS 10; 77.85/VS 11; 78.27/VS 12; 75.71/VS 13; 66.36/VS 14 and 43.44/VS 15. The chroma values for the reference source as measured in the CIE LAB space for each of the fifteen color samples were as follows 33.45/VS 1; 35.53/VS 2; 49.21/VS 3; 50.54/VS 4; 44.53/VS5; 44.23/VS 6; 46.86/VS 7; 46.59/VS 8; 60.98/VS 9; 76.53/VS 10; 76.41/VS 11; 73.59/VS 12; 67.58/VS 13; 68.51/VS 14 and 49.07/VS15. The delta chroma values given above represent the difference between the reference source chroma values and the chroma values measured for the test lamp. With regard to the examples below, the delta chroma values were calculated the same way as in this example.

Example 2

A T8 fluorescent lamp was constructed in accordance with otherwise conventional procedures, but with a phosphor layer comprising $3.5MgO*0.5MgF_2*GeO_2:Mn^{4+}$ (MfG); Yttrium Oxide:Eu $(Y_2O_3:Eu)$ (YEO); $(Ba,Sr,Ca)MgAl_{10}O_{17}:Eu^{2+}$ (BAM); $(Ba,Sr,Ca)MgAl_{10}O_{17}:Eu^{2+},Mn^{2+}$ (BAMn) and Cerium Lanthanum Phosphate $(LaPO_4:Ce,Tb)$ (LAP). The weight percents of the phosphors were 19.44 wt %, 52.24 wt %, 1.43 wt %, 12.37 wt % and 14.52 wt %, respectively. The lamp comprised a barrier layer between the glass envelope and the phosphor layer. FIG. 5 shows the emission spectrum for the lamp of this Example.

When energized, the lamp generated light having delta chroma values for each of the fifteen color samples of the CQS system as follows (delta chroma value/CQS color sample): 2.8/VS 1; 4.2/VS 2; −4.2/VS 3; −1.3/VS 4; 3.1/VS 5; 9.1/VS 6; 13.8/VS 7; 8/VS VS 8; 4.3/VS 9; 4.6/VS 10; 0.6/VS 1; 2.5/VS12; 5.7/VS13; 2/VS 14 and −0.1/VS15. The lamp produced chromaticity coordinates (x,y) of 0.444 and 0.396, an operating lumens per watt (L/w) value of about 66 and a $Q_a$ value of 79 at a CCT of about 2840.

Example 3

A T8 fluorescent lamp was constructed in accordance with otherwise conventional procedures, but with a phosphor layer comprising $3.5MgO*0.5MgF_2*GeO_2:Mn^{4+}$ (MfG); Yttrium Oxide:Eu $(Y_2O_3:Eu)$ (YEO); $(Ba,Sr,Ca)MgAl_{10}O_{17}:Eu^{2+}$ (BAM) and $(Ba,Sr,Ca)MgAl_{10}O_{17}:Eu^{2+},Mn^{2+}$ (BAMn). The weight percents of the phosphors were 23.88 wt %, 57.44 wt %, 1.13 wt % and 17.56 wt %, respectively. The lamp comprised a barrier layer between the glass envelope and the phosphor layer.

When energized, the lamp generated light having delta chroma values for each of the fifteen color samples of the CQS system as follows (delta chroma value/CQS color sample): 2/VS 1; 5.3/VS 2; −3.2/VS 3; 6.4/VS 4; 13.1/VS 5; 21.9/VS6; 27/VS7; 11.9/VS 8; 3/VS 9; 10/VS 10; 7.8/VS 11; 9.4/VS 12; 11.7/VS 13; 5.6/VS14 and 0.2/VS15. The lamp produced chromaticity coordinates (x,y) of 0.47 and 0.385, an operating lumens per watt (L/w) value of about 65 and a $Q_a$ value of 65 at a CCT of about 2430.

Example 4

A T8 fluorescent lamp was constructed in accordance with otherwise conventional procedures, but with a phosphor layer comprising $3.5MgO*0.5MgF_2*GeO_2:Mn^{4+}$ (MfG); Yttrium Oxide:Eu $(Y_2O_3:Eu)$ (YEO); $(Ba,Sr,Ca)MgAl_{10}O_{17}:Eu^{2+}$ (BAM) and $(Ba,Sr,Ca)MgAl_{10}O_{17}:Eu^{2+},Mn^{2+}$ (BAMn). The weight percents of the phosphors were 26.29 wt %, 54.41 wt %, 0.89 wt % and 18.41 wt %, respectively. The lamp comprised a barrier layer between the glass envelope and the phosphor layer.

When energized, the lamp generated light having delta chroma values for each of the fifteen color samples of the CQS system as follows (delta chroma value/CQS color sample): 4.4/VS 1; 3/VS 2; −4.5/VS 3; 7.7/VS 4; 16/VS 5; 24.9/VS 6; 29.1/VS 7; 10.2/VS 8; −2.7/VS 9; 1.4/VS 10; 2.2/VS 11; 6.6/VS 12; 11.6/VS 13; 10.2/VS 14 and 6.4/VS 15. The lamp produced chromaticity coordinates (x,y) of 0.455 and 0.397, an operating lumens per watt (L/w) value of about 58 and a $Q_a$ value of 63 at a CCT of about 2780.

Example 5

A T8 fluorescent lamp was constructed in accordance with otherwise conventional procedures, but with a phosphor layer comprising $3.5MgO*0.5MgF_2*GeO_2:Mn^{4+}$ (MfG); Yttrium Oxide:Eu $(Y_2O_3:Eu)$ (YEO); Gadolinium Zinc Magnesium Pentaborate: Ce, Mn $(Gd(Zn,Mg)B_5O_{10}:Ce,Mn$ (CBM) and $(Ba,Sr,Ca)MgAl_{10}O_{17}:Eu^{2+},Mn^{2+}$ (BAMn). The weight percents of the phosphors were 14 wt %, 26 wt %, 40.5 wt % and 19.5 wt %, respectively. The lamp comprised a barrier layer between the glass envelope and the phosphor layer. FIG. 6 shows the emission spectrum for the lamp of this Example.

When energized, the lamp generated light having delta chroma values for each of the fifteen color samples of the CQS system as follows (delta chroma value/CQS color sample): 4.6/VS 1; 3.5/VS 2; −5.7/VS 3; 4.1/VS 4; 11.7/VS 5; 20.1/VS 6; 24.2/VS7; 8.8/VS VS 8; −1.8/VS 9; 0.4/VS 10; −0.1/VS 11; 4.2/VS 12; 9/VS 13; 7.5/VS 14 and 4.7/VS 15. The lamp produced chromaticity coordinates (x,y) of 0.448 and 0.397, an operating lumens per watt (L/w) value of about 52 and a $Q_a$ value of 64 at a CCT of about 2760.

Example 6

A T3 spiral compact fluorescent lamp was constructed in accordance with otherwise conventional procedures, but with a phosphor layer comprising Yttrium Oxide:Eu $(Y_2O_3:Eu)$ (YEO) and $(Ba,Sr,Ca)MgAl_{10}O_{17}:Eu^{2+},Mn^{2+}$ (BAMn). The respective weight percents (based on total weight of the phosphors) of the phosphors were 78.8 wt % and 21.2 wt %. When energized, the lamp generated light having delta chroma values for each of the fifteen color samples of the CQS system as follows (delta chroma value/CQS color sample): 0.3/VS1; 5.0/VS2; −6.4/VS3; −0.5/VS4; 4.9/VS5; 12.4/VS6; 16.8/VS7; 7.2/VS8; 1.5/VS9; 3.4/VS10; 0.1/VS11; 2.5/VS12; 5.5/VS13; −5.3/VS14 and −7.8/VS15. The lamp produced chromaticity coordinates (x,y) of 0.4572 and 0.4012, an operating lumens per watt (L/w) value of about 65 and a Qa value of 69 at a CCT of about 2660.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" used in connection with a quantity is inclusive of the stated value and has the meaning dictated by the context (for example, includes the degree of error associated with the measurement of the particular quantity). "Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present. The singular forms "a", "an" and "the" include plural referents unless the context clearly dictates otherwise. All ranges disclosed herein are inclusive of the recited endpoint and independently combinable. In the foregoing description, when a preferred range, such as 5 to 25 (or 5-25), is given, this means preferably at least 5 and, separately and independently, preferably not more than 25.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A lamp which when energized exhibits a correlated color temperature of between about 2000 Kelvin to about 3500 Kelvin and having an improved color quality scale, the lamp comprising:
   at least one light-emitting element having a light emission when energized; and
   wherein when said lamp is energized said lamp generates light with a total light emission having delta chroma values as follows:
   at least two color samples of the CQS are within the parameters
   −2 to 7 for VS1;
   −3 to 7 for VS2;
   −7 to 7 for VS3;
   at least one color sample of the CQS is within the parameters
   −2 to 8 for VS4;
   −2 to 14 for VS5;
   at least two color samples of the CQS are within the parameters
   1 to 25 for VS6;
   4 to 25 for VS7;
   −1 to 15 for VS8;
   at least two color samples of the CQS are within the parameters
   −2 to 7 for VS9;
   −4 to 6 for VS10;
   −2 to 8 for VS11;
   at least one color sample of the CQS is within the parameters
   −1 to 8 for VS12;
   −1 to 13 for VS13; and
   at least one color sample of the CQS is within the parameters
   −7 to 13 for VS14;
   −9 to 1.2 for VS15,
   wherein said delta chroma values are measured in the CIE LAB space;
   with the proviso that the lamp does not comprise an incandescent light-emitting element.

2. The lamp of claim 1, wherein said at least one light-emitting element is one of phosphor, vapor discharge, or high intensity discharge.

3. The lamp of claim 1, wherein said lamp is a combination of a fluorescent lamp, vapor discharge lamp, or a HID lamp, supplemented by one or more of OLED and LED.

4. The lamp of claim 1, wherein said lamp is a fluorescent or CFL lamp comprising a light-transmissive envelope, a fill gas sealed inside said envelope, wherein at least one of said light-emitting elements is a phosphor.

5. The lamp of claim 4, said lamp comprising a phosphor layer comprising a phosphor composition, said composition comprising at least two different phosphors.

6. The lamp of claim 5, said phosphor composition comprising at least a first phosphor and a second phosphor, wherein said first phosphor is selected from the group consisting of $Y_2O_3$:Eu; $3.5MgO*0.5MgF_2*GeO_2$:$Mn^{4+}$; Gd(Zn,Mg)$B_5O_{10}$:Ce,Mn; (Sr, Mg)$_3$(PO$_4$)$_2$:Sn; and combinations thereof, and said second phosphor comprises (Ba,Sr,Ca)MgAl$_{10}$O$_{17}$:$Eu^{2+}$,$Mn^{2+}$ and optionally further comprises a member selected from the group consisting of LaPO$_4$:Ce,Tb; ZnSiO$_4$:Mn; (Ce,Tb)MgAl$_{11}$O$_{19}$; (Ce,Tb)(Mg,Mn)Al$_{11}$O$_{19}$; and combinations thereof.

7. The lamp of claim 6, said phosphor blend further comprising a third phosphor selected from the group consisting of (Ba,Sr,Ca)MgAl$_{10}$O$_{17}$:$Eu^{2+}$; (Sr,Ba,Ca)$_5$(PO$_4$)$_3$Cl:Eu; Sr$_4$Al$_{14}$O$_{25}$:Eu; Y$_3$Al$_5$O$_{12}$:Ce; Ca$_{10}$(PO$_4$)$_6$FCl:Sb,Mn, and combinations thereof.

8. The lamp of claim 6, said first phosphor having an emission band with a maximum between about 590 nm and about 670 nm, and
   said second phosphor having an emission band with a maximum between about 500 nm and about 570 nm.

9. The lamp of claim 6, wherein said first phosphor is present in an amount of about 10 to about 90 weight percent and said second phosphor is present in an amount of about 5 to about 50 weight percent.

10. The lamp of claim 1, wherein when said lamp is energized said lamp exhibits a color quality scale $Q_a$ value of about 60 or above.

11. A lamp in accordance with claim 1,
    wherein at least one of said light-emitting element is a phosphor, and
    wherein when said lamp is energized said lamp generates light with a total light emission having delta chroma values as follows:
    at least two color samples of the CQS are within the parameters
    0 to 6 for VS1;
    −1 to 6 for VS2;
    −5 to 5 for VS3;
    at least one color sample of the CQS is within the parameters
    0 to 5 for VS4;
    0 to 10 for VS5;
    at least two color samples of the CQS are within the parameters
    3 to 20 for VS6;
    6 to 20 for VS7;
    2 to 10 for VS8;
    at least two color samples of the CQS are within the parameters
    0 to 5 for VS9;
    0 to 5 for VS10;
    0 to 5 for VS11;
    at least one color sample of the CQS is within the parameters
    0 to 6 for VS12;
    0 to 10 for VS13; and
    at least one color sample of the CQS is within the parameters
    −6 to 10 for VS14;
    −8 to 10 for VS15.

12. A lamp having an improved color quality scale, the lamp comprising
    a phosphor layer comprising a phosphor composition, said composition comprising at least a first phosphor and a second phosphor, said first phosphor being selected from the group consisting of $Y_2O_3$:Eu; Gd(Zn,Mg)B$_5$O$_{10}$:Ce,Mn; (Sr,Mg)$_3$(PO$_4$)$_2$:Sn; and combinations thereof, and said second phosphor comprising (Ba,Sr,Ca)MgAl$_{10}$O$_{17}$:$Eu^{2+}$,$Mn^{2+}$ and further comprising a member being selected from the group consisting of LaPO$_4$:Ce,Tb; ZnSiO$_4$:Mn; (Ce,Tb)MgAl$_{11}$O$_{19}$; (Ce,Tb)(Mg,Mn)Al$_{11}$O$_{19}$; and combinations thereof;

wherein when said lamp is energized said lamp exhibits a correlated color temperature of between about 2000 to about 3500 Kelvin and a color quality scale Q$_a$ value of about 60 or above.

13. The lamp of claim 12, said first phosphor having an emission band with a maximum between about 590 to about 670 nm.

14. The lamp of claim 12, said second phosphor having an emission band with a maximum between about 500 to about 570 nm.

15. The lamp of claim 12, said composition further comprising a phosphor having an emission band with a maximum between about 430 and about 490 nm.

16. The lamp of claim 12, said phosphor composition further comprising a third phosphor selected from the group consisting of (Ba,Sr,Ca)MgAl$_{10}$O$_{17}$:Eu$^{2+}$; (Sr,Ba,Ca)$_5$(PO$_4$)$_3$Cl:Eu; Sr$_4$Al$_{14}$O$_{25}$:Eu; Y$_3$Al$_5$O$_{12}$:Ce; Ca$_{10}$(PO$_4$)$_6$FCl:Sb,Mn; and combinations thereof.

17. The lamp of claim 12, wherein said first phosphor is Y$_2$O$_3$:Eu.

18. The lamp of claim 12, further comprising a light-transmissive glass envelope having an inner surface, a discharge-sustaining fill gas sealed inside said envelope, and a barrier layer positioned between said envelope and said phosphor layer, wherein said barrier layer comprises alumina particles.

19. The lamp of claim 12, wherein the discharge-sustaining fill gas contains mercury.

20. A lamp having an improved color quality scale, the lamp comprising
a phosphor layer comprising a phosphor composition, said composition comprising at least a first phosphor and a second phosphor;
said first phosphor having an emission band with a maximum between about 590 nm and about 670 nm, wherein said first phosphor is present in an amount of about 10 to about 90 weight percent, said first phosphor being selected from the group consisting of Y$_2$O$_3$:Eu; 3.5MgO*0.5MgF$_2$*GeO$_2$:Mn$^{4+}$; Gd(Zn,Mg)B$_5$O$_{10}$:Ce,Mn; (Sr,Mg)$_3$(PO$_4$)$_2$:Sn; and combinations thereof;
said second phosphor having an emission band with a maximum between about 500 nm and about 570 nm, wherein said second phosphor is present in an amount of about 5 to about 50 weight percent, and
said lamp having a Q$_a$ value greater than about 60 and a correlated color temperature between about 2000 and about 3500 Kelvin.

21. The lamp of claim 20, said second phosphor comprising (Ba,Sr,Ca)MgAl$_{10}$O$_{17}$:Eu$^{2+}$,Mn$^{2+}$ and optionally further comprising a member being selected from the group consisting of LaPO$_4$:Ce,Tb; ZnSiO$_4$:Mn; (Ce,Tb)MgAl$_{11}$O$_{19}$; (Ce,Tb)(Mg,Mn)Al$_{11}$O$_{19}$; and combinations thereof.

22. The lamp of claim 20, wherein said first phosphor is Y$_2$O$_3$:Eu and said second phosphor is (Ba,Sr,Ca)MgAl$_{10}$O$_{17}$:Eu$^{2+}$,Mn$^{2+}$.

23. The lamp of claim 20, said composition further comprising a phosphor having an emission band with a maximum between about 430 and about 490 nm.

24. The lamp of claim 20, said composition further comprising a third phosphor selected from the group consisting of (Ba,Sr,Ca)MgAl$_{10}$O$_{17}$:Eu$^{2+}$,Mn$^{2+}$; LaPO$_4$:Ce,Tb; ZnSiO$_4$:Mn; (Ce,Tb)MgAl$_{11}$O$_{19}$; (Ce,Tb)(Mg,Mn)Al$_{11}$O$_{19}$; (Ba,Sr,Ca)MgAl$_{10}$O$_{17}$:Eu$^{2+}$; (Sr,Ba,Ca)$_5$(PO$_4$)$_3$Cl:Eu; Sr$_4$Al$_{14}$O$_{25}$:Eu; Y$_3$Al$_5$O$_{12}$:Ce ; Ca$_{10}$ (PO$_4$)$_6$FCl:Sb,Mn; and combinations thereof.

25. The lamp of claim 20, further comprising a light-transmissive glass envelope having an inner surface, a discharge-sustaining fill gas sealed inside said envelope, and a barrier layer positioned between said envelope and said phosphor layer, wherein said barrier layer comprises alumina particles.

26. A fluorescent lamp having an improved color quality scale, the lamp comprising a phosphor layer comprising a phosphor composition, said phosphor composition comprising: Y$_2$O$_3$:Eu; (Ba,Sr,Ca)MgAl$_{10}$O$_{17}$:Eu$^{2+}$,Mn$^{2+}$; LaPO$_4$:Ce,Tb; and (Ba,Sr,Ca)MgAl$_{10}$O$_{17}$:Eu$^{2+}$;
wherein Y$_2$O$_3$:Eu is present in the phosphor composition in an amount of about 10 to about 90 weight percent, and the combined amount of (Ba,Sr,Ca)MgAl$_{10}$O$_{17}$:Eu$^{2+}$,Mn$^{2+}$ and LaPO$_4$:Ce,Tb in the phosphor composition is from about 5 to about 50 weight percent:
and wherein said lamp has a Qa value greater than about 60.

27. The lamp of claim 26, further comprising a light-transmissive glass envelope having an inner surface, a discharge-sustaining fill gas sealed inside said envelope, and a phosphor layer carried on the inner surface.

28. A fluorescent lamp having an improved color quality scale, the lamp comprising a phosphor layer comprising a phosphor composition, said phosphor composition comprising: Y$_2$O$_3$:Eu; (Ba,Sr,Ca)MgAl$_{10}$O$_{17}$:Eu$^{2+}$,Mn$^{2+}$; and (Ba,Sr,Ca)MgAl$_{10}$O$_{17}$:Eu$^{2+}$;
wherein Y$_2$O$_3$:Eu is present in the phosphor composition in an amount of about 10 to about 90 weight percent, and the amount of (Ba,Sr,Ca)MgAl$_{10}$O$_{17}$:Eu$^{2+}$,Mn$^{2+}$ in the phosphor composition is from about 5 to about 50 weight percent;
and wherein said lamp has a Qa value greater than about 60.

29. The lamp of claim 28, further comprising a light-transmissive glass envelope having an inner surface, a discharge-sustaining fill gas sealed inside said envelope, and a phosphor layer carried on the inner surface.

* * * * *